(12) United States Patent
Faus et al.

(10) Patent No.: US 8,935,687 B2
(45) Date of Patent: Jan. 13, 2015

(54) INCREMENTALLY UPDATING A SOFTWARE APPLIANCE

(75) Inventors: Norman Lee Faus, Raleigh, NC (US); David P. Huff, Cary, NC (US); Bryan M. Kearney, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1211 days.

(21) Appl. No.: 12/040,834

(22) Filed: Feb. 29, 2008

(65) Prior Publication Data

US 2009/0222806 A1   Sep. 3, 2009

(51) Int. Cl.
*G06F 9/44* (2006.01)
*G06F 9/445* (2006.01)
*G06F 11/14* (2006.01)

(52) U.S. Cl.
CPC ... *G06F 8/63* (2013.01); *G06F 8/65* (2013.01); *G06F 11/1433* (2013.01); *G06F 8/68* (2013.01); *G06F 8/67* (2013.01); *G06F 8/60* (2013.01)
USPC .......................................... 717/168; 717/172

(58) Field of Classification Search
CPC .............. G06F 8/65; G06F 8/67; G06F 8/68; G06F 8/60; G06F 11/1433
See application file for complete search history.

(56) References Cited

U.S. PATENT DOCUMENTS

| | | | |
|---|---|---|---|
| 6,367,077 B1 | 4/2002 | Brodersen et al. | |
| 6,578,199 B1 | 6/2003 | Tsou et al. | |
| 7,461,095 B2 | 12/2008 | Cohen et al. | |
| 7,624,394 B1 | 11/2009 | Christopher, Jr. | |
| 7,945,897 B1 | 5/2011 | Cook | |
| 8,181,174 B2 * | 5/2012 | Liu | 718/1 |
| 8,255,650 B1 * | 8/2012 | Gruttadauria et al. | 711/162 |
| 2002/0029326 A1 * | 3/2002 | Reuter et al. | 711/206 |
| 2002/0086688 A1 | 7/2002 | Kang | |
| 2002/0129352 A1 | 9/2002 | Brodersen et al. | |
| 2003/0220835 A1 * | 11/2003 | Barnes, Jr. | 705/14 |
| 2005/0044541 A1 | 2/2005 | Parthasarathy et al. | |
| 2006/0101451 A1 | 5/2006 | Fong | |
| 2006/0146991 A1 * | 7/2006 | Thompson et al. | 379/67.1 |
| 2006/0155735 A1 * | 7/2006 | Traut et al. | 707/101 |
| 2007/0053513 A1 | 3/2007 | Hoffberg | |
| 2007/0074201 A1 | 3/2007 | Lee | |
| 2007/0078988 A1 * | 4/2007 | Miloushev et al. | 709/227 |
| 2007/0159650 A1 | 7/2007 | Takamatsu et al. | |
| 2007/0169079 A1 | 7/2007 | Keller et al. | |
| 2007/0245332 A1 | 10/2007 | Tal et al. | |
| 2007/0250672 A1 * | 10/2007 | Stroberger et al. | 711/162 |
| 2007/0294314 A1 * | 12/2007 | Padovano et al. | 707/201 |
| 2008/0004904 A1 | 1/2008 | Tran | |

(Continued)

OTHER PUBLICATIONS

USPTO; Office action for U.S. Appl. No. 12/131,004, mailed Aug. 16, 2011.

(Continued)

*Primary Examiner* — Li B Zhen
*Assistant Examiner* — Arshia S Kia
(74) *Attorney, Agent, or Firm* — Lowenstein Sandler LLP (57) ABSTRACT

An appliance support module can be configured to update and upgrade the software incrementally. To achieve this, the appliance support module can be configured to receive a request to update or upgrade a software appliance. The request can include the update or upgrade requested and information describing the software appliance to upgrade or update. Based on the request, the appliance support module can be configured to determine alterations to make to a original binary image of the software appliance to upgrade or update.

22 Claims, 8 Drawing Sheets

(56) References Cited

U.S. PATENT DOCUMENTS

| | | | |
|---|---|---|---|
| 2008/0022271 | A1 | 1/2008 | D'Angelo et al. |
| 2008/0052384 | A1 | 2/2008 | Marl et al. |
| 2008/0082601 | A1 | 4/2008 | Meijer et al. |
| 2008/0086727 | A1* | 4/2008 | Lam et al. .................. 718/1 |
| 2008/0263258 | A1 | 10/2008 | Allwell et al. |
| 2009/0064086 | A1 | 3/2009 | Faus |
| 2009/0144718 | A1 | 6/2009 | Boggs |
| 2009/0217244 | A1 | 8/2009 | Bozak et al. |
| 2009/0217255 | A1* | 8/2009 | Troan ........................... 717/168 |
| 2009/0222805 | A1 | 9/2009 | Faus |
| 2009/0222808 | A1 | 9/2009 | Faus |
| 2009/0249488 | A1 | 10/2009 | Robinson et al. |
| 2009/0300164 | A1 | 12/2009 | Boggs |
| 2009/0300584 | A1 | 12/2009 | Faus |
| 2009/0300593 | A1 | 12/2009 | Faus |
| 2009/0300601 | A1 | 12/2009 | Faus |
| 2010/0306773 | A1* | 12/2010 | Lee et al. .................. 718/1 |
| 2011/0035733 | A1* | 2/2011 | Horning et al. .............. 717/140 |
| 2011/0170837 | A1* | 7/2011 | Barnes, Jr. .................. 386/239 |

OTHER PUBLICATIONS

USPTO; Office action for U.S. Appl. No. 12/131,004, mailed Mar. 13, 2012.
USPTO; Office action for U.S. Appl. No. 12/128,299, mailed Aug. 17, 2011.
USPTO; Office action for U.S. Appl. No. 12/128,299, mailed Jan. 31, 2012.
USPTO; Office action for U.S. Appl. No. 12/131,004, mailed Sep. 28, 2012.
USPTO; Office action for U.S. Appl. No. 12/128,299, mailed Sep. 17, 2012.
Office action for U.S. Appl. No. 12/131,004, mailed Jan. 30, 2013.
Office action for U.S. Appl. No. 12/128,299, mailed Feb. 7, 2013.
Office action for U.S. Appl. No. 12/131,004, mailed May 20, 2013.
Office action for U.S. Appl. No. 12/128,299, mailed May 6, 2013.
Office action for U.S. Appl. No. 12/131,004, mailed Oct. 23, 2013.
Office action for U.S. Appl. No. 12/128,299, mailed Oct. 9, 2013.
Reimer, Darrell, et al., "Opening Black Boxes: Using Semantic Information to Combat Virtual Machine Image Sprawl," published in VEE '08 Proceedings of the fourth ACM SIGPLAN/SIGOPS international conference on Virtual execution environments, pp. 111-120, ACM New York, NY, USA © 2008, table of contents ISBN: 978-1-59593-796-4.
Gerla, Tim, Field Engineer, rPath, Inc. "From Application to Appliance Building Software Appliances with rPath's rBuilder," 15 pages, Apr. 14, 2008.
USPTO, Office Action for U.S. Appl. No. 12/131,004 mailed Mar. 27, 2014.
USPTO, Office Action for U.S. Appl. No. 12/128,299 mailed Mar. 20, 2014.

* cited by examiner

INCREMENTALLY UPDATING A SOFTWARE APPLIANCE

FIELD

This invention relates generally to products and services, more particularly, to systems and methods for software appliance related services and products.

DESCRIPTION OF THE RELATED ART

The proliferation of the World Wide Web through the Internet has made a wealth of products and services available to users to purchase and use nearly instantaneously. Vendors, service providers, manufacturers, third party distributors, etc., may have websites for the users to review and purchase their respective products and/or services and to obtain technical support for the product and/or services.

Although most computers come pre-configured with some computer software, most users must install and/or configure additional computer software on their computer to tailor their computer for their particular needs. Such computer software installation and/or configuration can be as easy as a one step activation of an installation program. Because of this complex nature, the post install configuration can not be automated without some level of user interaction or knowledge of the pre-existing system. However, in order to make software truly operational, more complex computer applications require a user to perform post-installation configuration of the software.

Additionally, most software is designed to meet the needs of a wide range users. As such, the software is designed to include features and components to addresses all requirements. For example, operating systems (OS) are designed to be universally compatible with a multitude of applications and compatible with different computing system. Unfortunately, the universal nature of the software has caused the size and cost of the software to increase dramatically. For example, OS may be many gigabytes in size.

Additionally, when upgrading software, the user must upgrade all the features and components of the software. This causes the user to purchase and install unnecessary features and components of the software. Additionally, when updating the software, the user must update all the features and components of the software. However, most users do not require and use the features and components that must be constantly updated. As such, the user wastes resources on upgrading and updating features and components of software not typically utilized. Thus, there is a need in the art for methods and system that provide software updates and upgrades that are specifically tailored to users.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

According to embodiments, an appliance support module can be configured to update and upgrade the software incrementally. To achieve this, the appliance support module can be configured to receive a request to update or upgrade a software appliance. The request can include the update or upgrade requested and information describing the software appliance to upgrade or update. Based on the request, the appliance support module can be configured to determine alterations to make to a original binary image of the software appliance to upgrade or update.

By providing upgrades and updates to a software appliance that are specifically tailored, the user is not required to purchase and install unnecessary software upgrades and updates. Accordingly, the user can implement the software updates and upgrades by utilizing less space and at reduced cost.

Figure 1:
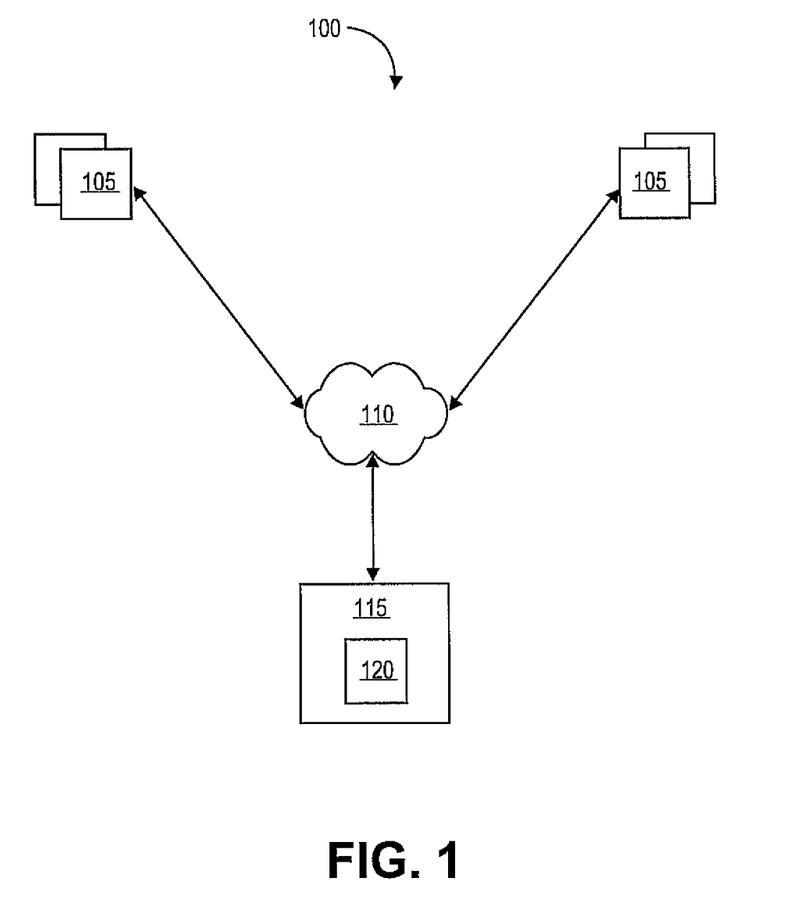
FIG. 1 depicts an exemplary system in accordance with an embodiment.

FIG. 1 illustrates an exemplary system 100 in accordance with an embodiment. It should be readily apparent to those of ordinary skill in the art that system 100 depicted in FIG. 1 represents a generalized schematic illustration and that other components may be added or existing components may be removed or modified. Moreover, system 100 may be implemented using software components, hardware components, or combinations thereof.

As shown in FIG. 1, system 100 includes users 105, a network 110 and a web service portal 115. Users 105 can be private individuals, employees of private business or public entities or other persons interested in accessing web service portal 115. Users 105 can access web service portal 115 using personal computers, personal mobile devices, workstations or other networked computing platforms.

Network 110 can be a combination of wide area and local area networks such as the Internet. Network 110 can be configured to provide a communication channel between users 105 and web service portal 115. Network 110 can implement a variety of network protocols to provide the communication channel such as Internet Protocol ("IP") Vx, ATM, SONET, or other similar network protocols.

Web service portal 115 can be configured to provide products and services to user 105 as well as provisioning, installation services, updates to software and hardware products and technical support. Web service portal 115 can, among other functions, provide a list of products such as software applications, software appliances and/or hardware devices as well as services such as installation, configuration, maintenance, etc., for users 105 to purchase. As a non-limiting example, web service portal 115 can also provide information for users to research, compare and purchase software, hardware and consulting services in support of those software and/or hardware purchases. Web service portal 115 can also be configured to provide support services, for free or by subscription, to those same software, service, and/or hardware purchases.

In accordance with various embodiments, web service portal 115 can be configured to provide an appliance support (AS) module 120 to provide software appliances to users 105 and support the software appliances.

Figure 2:
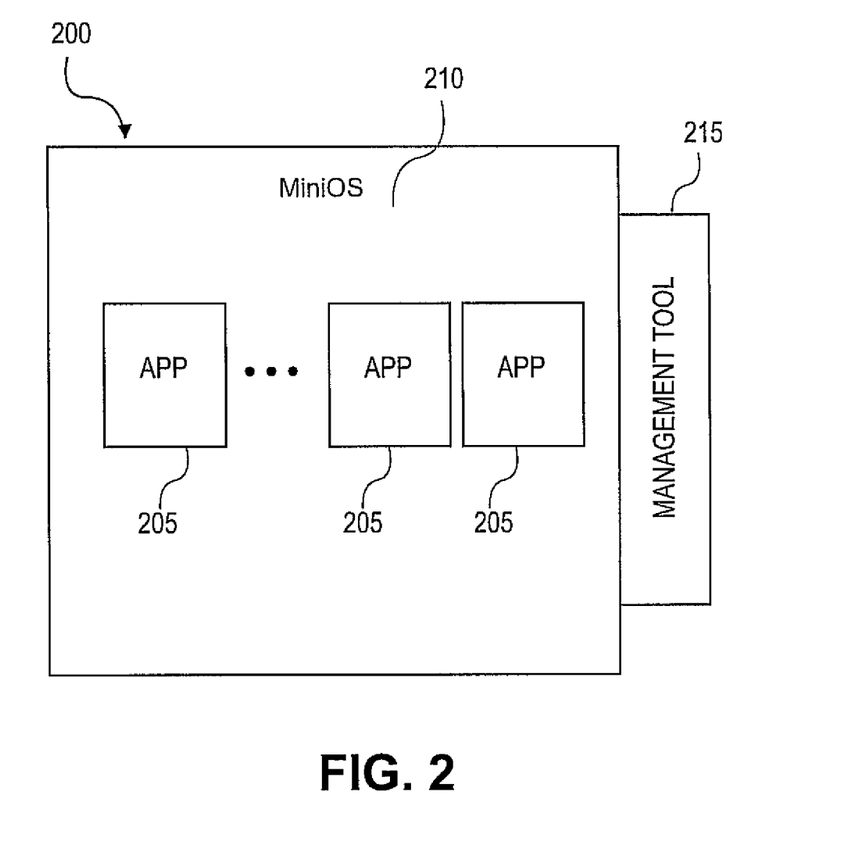
FIG. 2 illustrates an exemplary software appliance in accordance with various embodiments.

FIG. 2 shows an exemplary software appliance according to various embodiments. As shown, a software appliance 200 can comprise one or more applications 205 combined with a "minimum amount of an operating system" (MiniOS) 210 to allow application(s) 205 to run on a computing platform or in a virtual machine executing on a computing platform. MiniOS 210 can comprise a subset of the components of a complete OS that contains enough resources to support the application(s) 205 intended to be encapsulated with MiniOS 210. Software appliance 200 occupies less space than regular or self-standing applications and independent OSes, because MiniOS 210 includes a set of reduced features and components required to provide an application space for application(s) 205 of the software appliance.

Software appliance 200 comprises a binary image of application(s) 205 and selected MiniOS 210 contained in software appliance 200. The image contains the bits of software appliance 200 as installed on a computing platform. As such, to place software appliance 200 on computing platform, software appliance 200 only needs to be physically copied to the memory or storage of the computing platform and, then, configured to function with the computing platform or virtual machine running on the computing platform. In embodiments, software appliance 200 can be distributed via media such as CD-ROM, DVD-ROM, high-definition format discs or flash media, transmitted via a network, or can be downloaded from a Web site or other location.

Software appliance 200 can streamline the distribution of applications by minimizing the tasks typically associated with installation, configuration and maintenance. Software appliance 200 is completely functional as a self-contained unit, and requires no separately installed or configured OS to function. Inside software appliance 200, application(s) 205 and MiniOS 210 are pre-configured to function and operate together. As such, once software appliance 200 is placed on a computing platform or virtual machine, software appliance 200 only requires a configuration of the software appliance to the computing platform or virtual machine.

Additionally, software appliance 200 can be pre-configured for a specific client or computing platform on which it will be placed. Specifically, during creation of software appliance 200, MiniOS 210 and application(s) 205 of software appliance 200 can be pre-configured with the settings and parameters of the client or computing platform on which it will be placed. For example, if software appliance 200 includes a server OS and Email server application, the server OS and Email server application can be pre-configured to operate with the network settings of the the computing platform it be placed and the network it will serve. Accordingly, software appliance 200 needs only to be placed on the target client or computing platform without additional configuration. In embodiments, software appliance 200 can be installed to a variety of clients, servers or other target devices, such as network servers, personal computers, network-enabled cellular telephones, personal digital assistants, media players, and others, such as illustrated in FIG. 1 above.

Software appliance 200 can also be updated and upgraded in by several different processes. Since software appliance 200 is a binary image, an updated or upgraded software appliance can be created as a completely new binary image of the entire software appliance incorporating the updates or upgrades. To update or upgrade software appliance 200 using a complete image, the updated or upgraded appliance can simply replace software appliance 200. Alternatively, software appliance 200 can be updated or upgraded incrementally. For each update or upgrade, the bits of the binary image required to update or upgrade software appliance 200 can be determined. To update or upgrade software appliance 200, the update bits can be added to software appliance 200 on a binary-difference basis.

Software appliance 200 can also be configured to communicate with a management tool 215. Management tool 215 can for example be utilized in order to start/stop, configure, repair, and update software appliance 200. Management tool 215 can manage the entire software appliance 200, including both application(s) 205 and MiniOS 210. Likewise, management tool 215 can include multiple tools, for instance to manage application(s) 205 and MiniOS 210, separately.

Management tool 215 can be embedded in software appliance 200 itself. In such implementations, software appliance 200 can be managed from the particular computing platform on which it is placed. Additionally, management tool 215 can be separate from software appliance 200. For example, in a networked environment management tool 215 can be installed on a network server that communicates with one or more clients on the network in which software appliance 200 is installed. In networked implementations, management tool 215 can be configured to manage a set of multiple software appliances 200 across all clients from a single platform.

Returning to FIG. 1, according to various embodiments, AS module 120 can be configured to update and upgrade software appliances currently utilized by users 105. AS module 120 can be configured to update and upgrade the software incrementally. To achieve this, AS module 120 can be configured to receive a request to update or upgrade a software appliance via web service portal 115. The request can include the update or upgrade requested and information describing the software appliance to upgrade or update. Based on the request, AS module 120 can be configured to determine alterations to make to a original binary image of the software appliance to upgrade or update.

To determine the alterations to the original binary image, AS module 120 can be configured to determine the original binary image of the software appliance to upgrade or update. AS module 120 can be configured to determine the original binary image based on information provide in the request. Additionally, AS module 120 can be configured to determine the original binary image based on information maintained by AS module 120 regarding appliances provide to users 105.

Once the original binary image of the software appliance to be upgraded is determined, AS module 120 can determine a modified binary image of the software appliance including the requested update or upgrade. AS module 120 can be configured to compare the original binary image to the modified binary image to determine the difference in the two images. AS module 120 can be configured to set the difference in the two images as binary image modification bits.

AS module 120 can be configured to provide the binary image modification bits to user 105. AS module 120 can be configured to deliver the binary image modification bits via physical media or transmit the software appliance to user 105 via network 100. Likewise, AS module 120 can be configured to provide user 105 with a link to the binary image modification bits to allow the user to download the software appliance. Once received, user 105 can apply the binary image modification bits to the original binary image in order to update or upgrade the software appliance.

Figure 3:
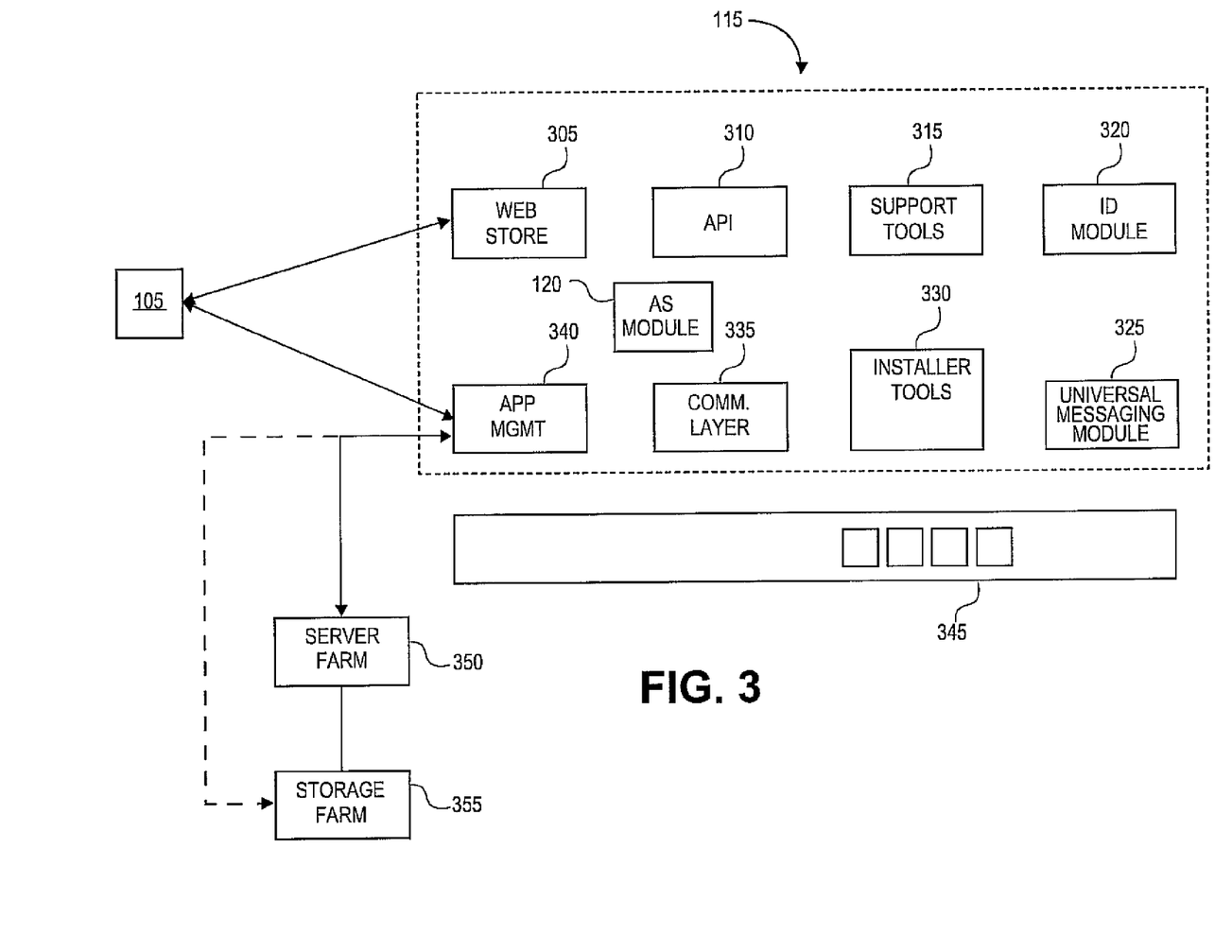
FIG. 3 illustrates an exemplary service portal of the system shown in FIG. 1 in accordance with another embodiment.

FIG. 3 illustrates a more detailed block diagram of web service portal 115 including AS module 120 in accordance with another embodiment. It should be readily apparent to those of ordinary skill in the art that web service portal 115 depicted in FIG. 3 represents a generalized schematic illustration and that other components may be added or existing components may be removed or modified.

As shown in FIG. 3, web service portal 115 can include a web store module 305 that a user can interface with the service portal. Web store module 305 can provide the graphical user interfaces ("GUIs") and associated functions and/or services for web service portal 115. As a non-limiting example, web store module 305 can generate a log-in GUI for a user to authenticate and enter web service portal 115.

Web store module 305 can couple with an application program interface ("API") module 310. API module 310 can be configured to provide an interface between the functions and/or services provided by web store module 305 and to the appropriate module of web service portal 115. More particularly, API module 310 can call or direct a requested function or service from the user to the respective module that provides that requested function or service. For example, a user may request a price of a product, e.g., product vending module, API module 310 can direct the request to a get price function in a support tools module 315. Additionally, a user may request a software appliance, API module 310 can direct the request to AS module 120.

API module 310 can also be configured to interface with support tools module 315. Support tools module 315 can be configured to provide the supporting software and hardware to implement the functionality of web service portal 115. Support tools module 315 can contain and provide access to databases that contain information such as products lines, software appliances services providers, on-line self-help (e.g., knowledgebase), etc. Support tools module 315 can also provide services like a chat services, a help desk, installation, provisioning, etc.

API module 310 can be further configured to couple with an identification ("ID") module 320. ID module 320 can be configured to provide identification management services for web service portal 115. ID module 320 can also store information related to users such as purchase history, user profile, usage history of the user, and entitlement data.

API module 310 can be further configured to couple with a universal messaging module 325. Universal messaging module 325 can be configured to provide a messaging application that unifies messages. More specifically, electronic mail ("email"), documents, and instant messaging can be linked in a single application. Universal messaging module 325 can also provide a mechanism for a user to view all the related documents for the user from email to Wiki pages.

An installer tools 330 can be coupled to API module 310. One of the services provided by web service portal 115 can be the purchase of software applications and software appliances provided by independent software vendors ("ISVs"). As part of the delivery of the software applications and appliances, the ISV can be required to maintain and update the installation tools to install their respective software applications and appliances. Accordingly, installer tools 330 can be a repository where independent software vendors can deposit their respective installation tools.

API module 310 can be further coupled to a communication layer 335 (labeled as COMM layer in FIG. 3). Communication layer 335 can be configured to provide the underlying services for the modules of web service portal 115 to communicate. For example, communication layer 335 can contain middleware for a product database to communicate with a graphical user interface requesting product description.

API module 310 can be further coupled to an application management module 340 (labeled as APP MGMT in FIG. 3). Application management module 340 can be configured to manage applications as requested by users. More specifically, a user may purchase a prepackaged software application pack (e.g., an operating system, electronic mail program and data mining program) from web service portal 115, which is stored in an application stack module 345. Application management module 340 can then deliver the purchased software stack, install and configure the software application stack at a third party site such as server farm 350 or store the software application stack in a storage farm 355 for the user to retrieve.

Server farm 350 can be configured to provide computing platforms for users to lease. Accordingly, users can have a backup version of their systems, a testing platform to perform quality assurance tests on new applications or new software appliances, execute a program requiring excessive MIPS, or any other similar computing task. Additionally, server farm 350 can be configured to store software appliances for download by users 105.

Storage farm 355 can be configured to provide storage space for users to lease. Accordingly, users can lease disk storage space to back up data, provide a hot data swap, or other storage intensive tasks. Additionally, storage farm 355 can be configured to store software appliances for download by users 105.

In some embodiments, AS module 120 can be configured to be executed in one of the other components (not shown). As illustrated, in other embodiments, CS module 120 can be executed as a standalone module.

Figure 4:
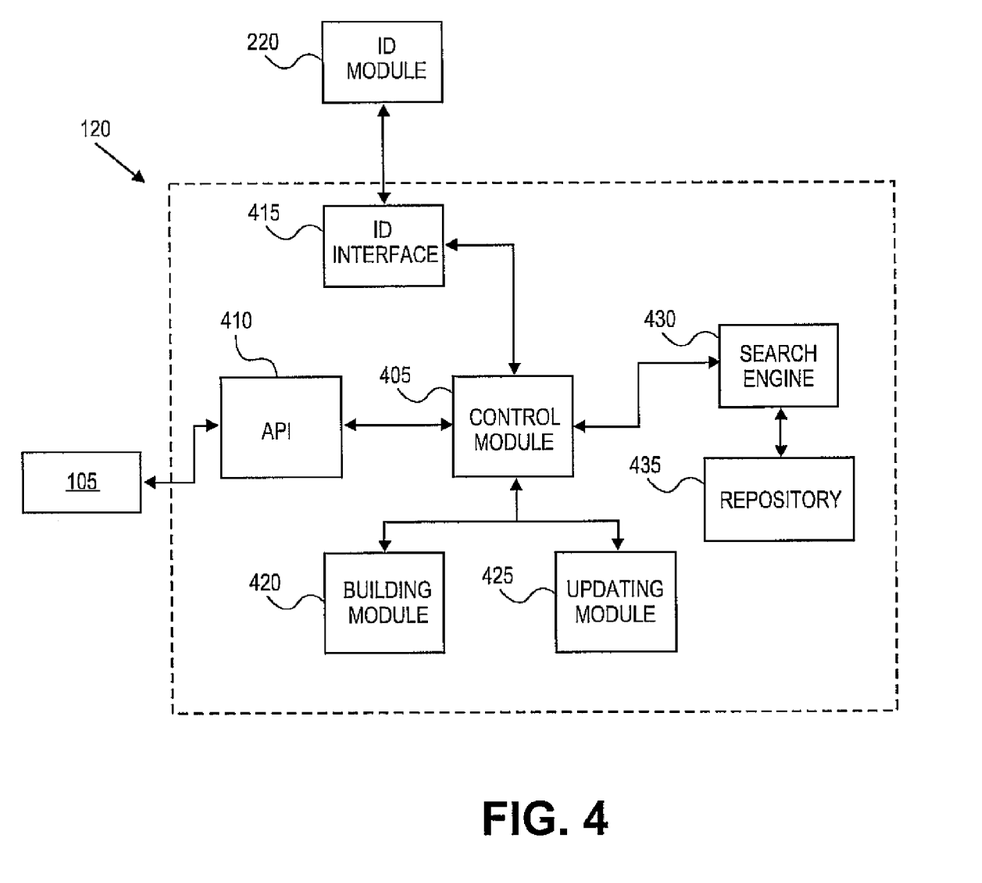
FIG. 4 depicts an exemplary AS module shown in FIG. 1 in accordance with yet another embodiment.

FIG. 4 depicts a more detailed block diagram of AS module 120 in accordance with another embodiment. It should be readily apparent to those of ordinary skill in the art that AS module 120 depicted in FIG. 4 represents a generalized schematic illustration and that other components may be added or existing components may be removed or modified.

As shown in FIG. 4, AS module 120 can comprise a control module 405, an application program interface ("API") 410, an identification ("ID") interface 415, a building module 420, an updating module 425, a search engine 420, and a repository 435. It should be readily obvious to one of ordinary skill in the art that the modules 405-435 can be implemented as software applications (programmed in C, C++, JAVA, PHP, etc.), hardware components (EEPROM, application specific integrated circuit, microprocessor, etc.) or combinations thereof.

Control module 405 can be configured to manage and interface with the other modules 410-435 to provide the functionality of the AS module 120 as described above and further described herein below. Additionally, control module 405 can be configured to interface with other modules such as ID module 320 via ID interface 415 as described above and further described herein below.

API 410 can be configured to generate GUIs, e.g. dialog boxes, web pages, as required by control module 405 and to provide an interface to other modules of web service portal 115. API 410 can be configured to operate in conjunction with web store 305 and API 310. For example, when a user 105 requests a software appliance related service or product in via web store 305, API 310 can pass the request to API 410. One skilled in the art will realize that API 410 is optional and that the functionality of API 410 can be performed by API 410.

According to embodiments, AS module 120 can be configured to update and upgrade software appliances currently utilized by users 105 incrementally. In particular, API 410 can be configured to receive a request to update or upgrade a software appliance via web service portal 115. The request can include the update or upgrade requested and information identifying the software appliance to upgrade or update.

A software appliance update typically includes one or more updates to the applications and MiniOS of the software appliance. For example, the updates can include patches to correct bugs and errors in the applications and MiniOS. A software appliance upgrade typically consists of adding additional applications and components of the MiniOS to an existing software appliance. For example, a user may choose to add an additional application to an existing software appliance. The update can include the new application and any components of the MiniOS to support the new application.

Figure 5A:
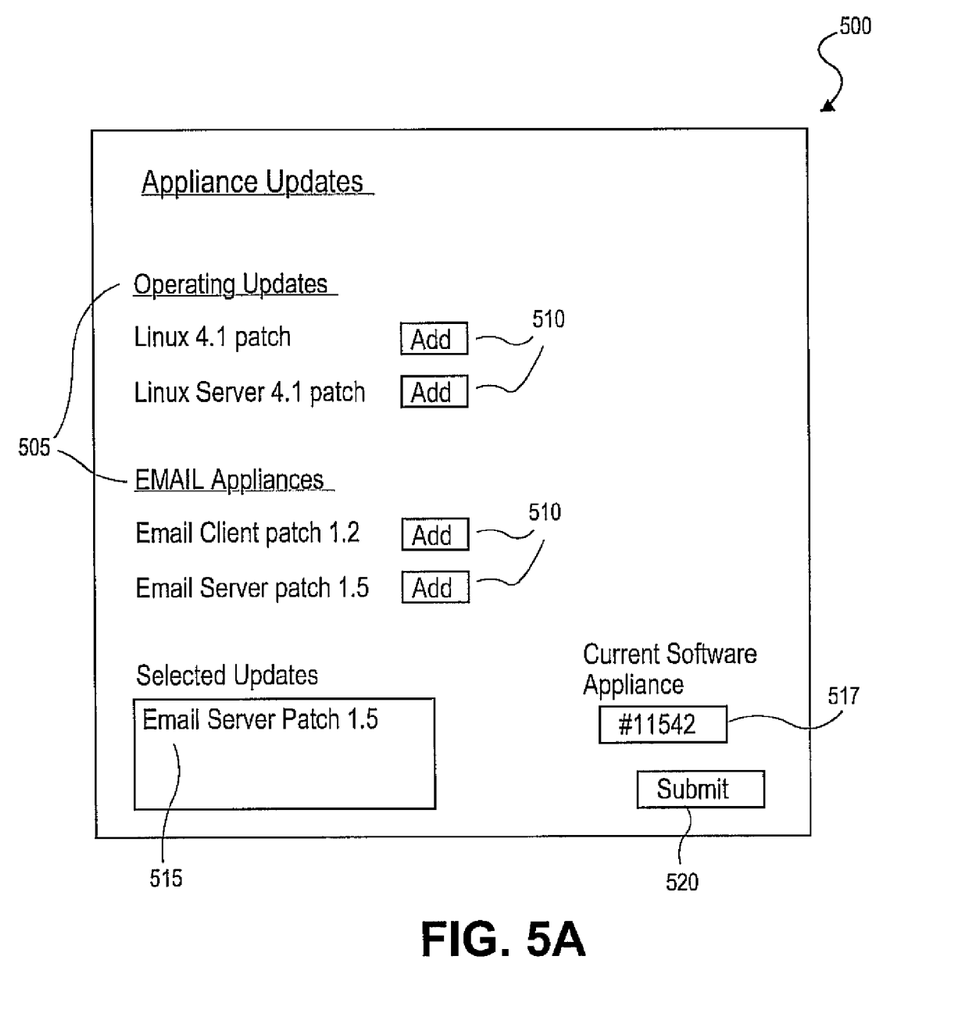
FIGS. 5A and 5B illustrate exemplary web site interfaces in accordance with yet another embodiment.

API can be configured to receive the request via an interface generated by web store 305. FIG. 5A shows an exemplary web page 500 generated by web store 305 to allow a user to request an update to a software appliance. As show, web page 500 includes update categories 505, update widgets 510, selected updates window 515, current software appliance field 517, and confirmation button 520.

As shown, web page 500 is configured to display the available updates based on categories 505. Appliance updates are displayed in categories 505 based on their associated functions. For example, category 505, which is labeled email appliances, can be configured to include the available Email related appliances updates: Email client patch 1.2 and Email server patch 1.5.

Web page 500 is configured to associated with each available appliance update a widget 510. Widget 510 allows the user to select the appliance update to be provided. For example, if the user desires an Email server update, the user can select widget 510 associated with the Email server update.

Web page 500 is configured to display the appliance updates selected by the user in selected update window 515. For example, in the user selects an email server update, selected update window 515 can display "Email server patch 1.5" as being selected. Selected update window 515 can also be configured to be interactive. As such, a user can select an appliance update displayed in selected update window 515 and remove the appliance update if necessary.

Current software appliance field 517 can be configured to receive information that identifies the software appliance to be updated. For example, field 517 can be configured to receive a serial number uniquely identifying the software appliance. Once the user has made selections in web page 500, web store 305 can be configured to send the request for the selected appliance updates to AS module 120.

While FIG. 5A illustrates software updates, one skilled in the art will realize that FIG. 5A is exemplary. A web page 500 can also be configured to include software upgrades available for request by users 105.

Likewise, API 410 can be configured to operate in conjunction with other modules of web service portal 115 such as universal messaging module 325. For example, a user 105 can submit a request for a software appliance update or upgrade in a message, such as an email. Additionally, software appliance can be configured to automatically or manually request software updates. As such, API 310 can pass the request from universal messaging module 325 to API 410.

Control module 405 can be configured to receive the user's request via API 410. The request can include the update or upgrade requested and information describing the software appliance to upgrade or update. Based on the request, control module 405, in conjunction with updating module 425, can be configured to determine alterations to make to an original binary image of the software appliance to upgrade or update.

To achieve this, control module 405 can be configured to determine the original binary image of the software appliance. Control module 405 can be configured to determine the recipe of the original binary image. The recipe describes the bits that make up the applications and MiniOS included in the particular software appliance requesting to be updated. Control module 405 can be configured to determine the recipe from the request. For example, the request to update or upgrade can include the recipe of the software appliance.

Additionally, control module 405 can be coupled to repository 435. Repository 435 can be implemented in any structure such as a database. For example, repository 435 can be implemented utilizing any type of conventional database architecture using open source technologies, proprietary technologies, or combinations thereof.

Repository 435 can be configured to can to store a record of software appliances downloaded by users. The record can include the user ID information associated with all appliances provided to the user. For example, the record can include a list of user ID information associated with serial numbers of software appliances provide to corresponding users. The records can also include the recipes of the software appliances provided to the users, associated with the ID information.

Control module 405 can be configured to be couple to search engine 430. Control module 405 can be configured to direct search engine 430 to locate the records based on the ID information of the user requesting. The ID information can be contained in the request. Additionally, control module 305 can be coupled to ID interface 415. ID interface 415 can be coupled to ID module 320 of web service portal 115. Control module can utilize ID interface 415 to retrieve the ID information for the user.

In addition to retrieving the recipe of the software appliance, control module 405 can be configured to retrieve a copy of binary image the original appliance. As such, repository 435 can be configured to store various software appliances which are provided to user 105. For example, repository 435 can maintain various software appliances such as Email Server appliance, application server appliance, customer relation management (CRM) appliance, enterprise resource planing (ERP) appliance, and the like. Repository 435 can be configured to store the binary image of the software appliance. Likewise, repository 435 can be configured to store updated and upgraded version of the software appliances. Repository 435 can also be configured to store recipes for updated and upgraded version of the software appliances.

As mentioned above in FIG. 2, the software appliance includes one or more applications and MiniOS to support the applications. For example, for the Email Server appliance, the appliance can include the Email Sever application and MiniOS to support the functionality of the Email Server. In addition to storing complete software appliances, repository 435 can also be configured to store pieces of the software appliance. Repository 435 can be configured to store the bits of various applications and the bits of various configurations MiniOS. Repository 435 can also be configured to store recipes for the bits of various applications and the bits of various configurations MiniOS.

Additionally, repository 435 can also be configured to store the updated bits of various applications and the updated bits of the various MiniOS. Repository 435 can also be configured to store the recipe for updated bits of various application and the updated bits of the various MiniOS.

Once control module 405 determines the original binary image of the software appliance, AS module 120 can be configured to determine the requested update or upgrade. To achieve this, control module 405 can be coupled to updating module 425. Updating module 425 can be configured to determine alterations to make the original binary image of the software appliance in order to upgrade or update the software appliance. Updating module 425 can be configured to compare the original binary image to a modified binary image to determine the difference in bits.

Updating module 425 can be configured to determine the difference in bits as a bit modification. The bit modification can include new bits to replace original bits in the original binary image, new bits to add to the original binary image, and/or a list of bits to delete from the original binary image. In order to upgrade or update a software appliance, a user needs only to apply the bit modification.

To determine the bit modification, updating module 425 can be configured to determine the bit modification by comparing the original binary image of the software appliance to a modified binary image of the software appliance including the requested update or upgrade. To compare the binary images, updating module 425 can be configured to receive the original binary image from control module 405 and the modified binary image from control module 405. Additionally, updating module 425 can be configured to build the modified binary image from bits of application and portions of the MiniOS. Updating module 425 can be configured to build the original binary image and the modified binary image from the respective recipes.

Additionally, updating module 425 can be configured to determine the bit modification by comping the recipe of the original software appliance and recipe of the updated or upgraded software appliance. Updating module 425 can be configured to compare the recipes to determine a modification recipe for bit modification. Updating module 425 can be configured to build the bit modification based on the modification recipe. To build the modified bits, updating module 425 can be configured to request that control module 405 retrieve the bits to necessary to create the bit modification. Updating module 425 can be configured to combine the retrieved bits to form the bit modification.

After comparison, updating module 425 can be configured to pass the bit modification to control module 425. After receiving the bit modification, control module 405 can be configured to provide the bit modification to user 105 to upgrade or update the software appliance. Control module 405 can pass the bit modification to API 410. API 410 can be configured to provide the bit modification to the user. API 410 can be configured to pass the bit modification to universal messing module 305 in order to be transmitted to the user. For example, universal messaging module 305 can transmit the bit modification to the user in an email message.

Additionally, API 410 can place the bit modification on server farm 350 or storage farm 355 for downloading at a later time. As such, API 410 can instruct universal messaging module to transmit a link to the user to allow the user to download the bit modification. Also, API can be configured to instruct web store 305 to provide the link in a web page.

Figure 5B:
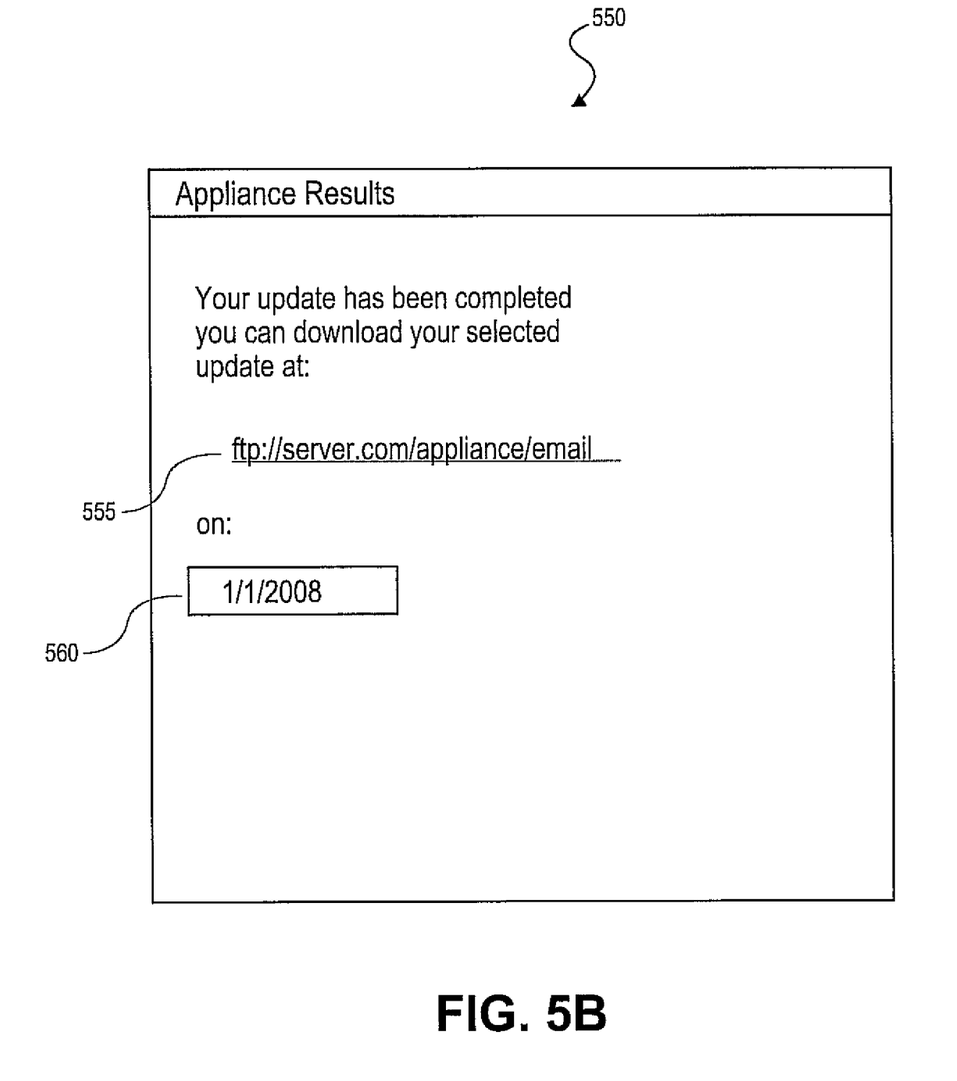

FIG. 5B shows an exemplary web page 550 for providing the link to the user. As shown, web page 550 includes the a link 555 and an availability date field 560. Link 555 is configured to allow the user to download the bit modification from server farm 350 or storage farm 355. For example, by activating the link, the user's browser program can be configured to initiate a download process. Web page 550 can also be configured to include an availability date field 560. Field 560 is configured to display a date the bit modification will be ready for download. For example, field 560 can display a date in the future or "immediately" if the complete appliance is ready for download.

Returning to FIG. 4, in order to build a new appliance, control module 405 can be coupled to building module 420. Building module 420 can be configured to build appliances from the bits of applications and bits of MiniOS stored in repository 435.

Figure 6:
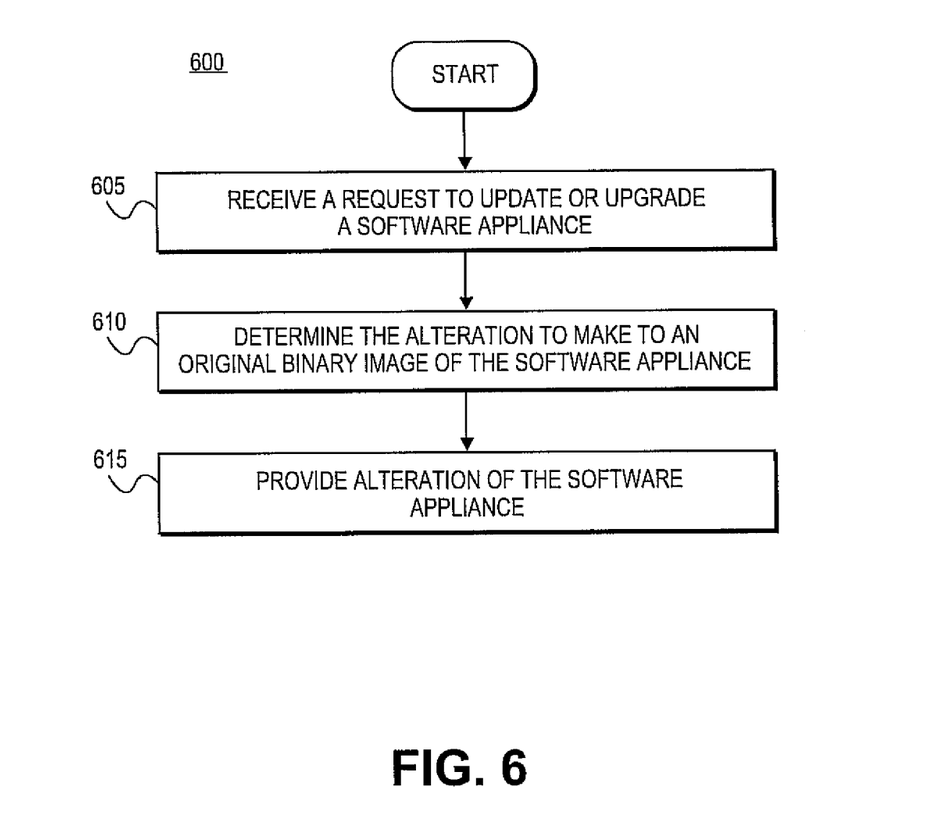
FIG. 6 depicts an exemplary flow diagram in accordance with yet another embodiment.

FIG. 6 illustrates a flow diagram 600 for providing a software appliance from AS module 120 in accordance with various embodiments. It should be readily apparent to those of ordinary skill in the art that the flow diagram 600 depicted in FIG. 6 represents a generalized schematic illustration and that other steps may be added or existing steps may be removed or modified.

As shown in FIG. 6, AS module 120 can be configured to receive a request to update or upgrade a software appliance, step 605. The request can include the update or upgrade requested and information describing the software appliance to upgrade or update.

Based on the request, in step 610, AS module 120 can determine alterations to make to the binary image of the software appliance. AS module 120 can determine the alterations based on a comparison of the original binary image and a modified binary image that includes the requested update or upgrades. Additionally, AS module 120 can determine the alteration based on the recipes of the original binary image and the modified binary image.

In step 615, AS module 120 can provide the alterations to user. AS module 120 can be configured to deliver the binary image modification bits via physical media or transmit the software appliance to user 105 via network 100. Likewise, AS module 120 can be configured to provide user 105 with a link to the binary image modification bits to allow the user to download the software appliance.

Figure 7:
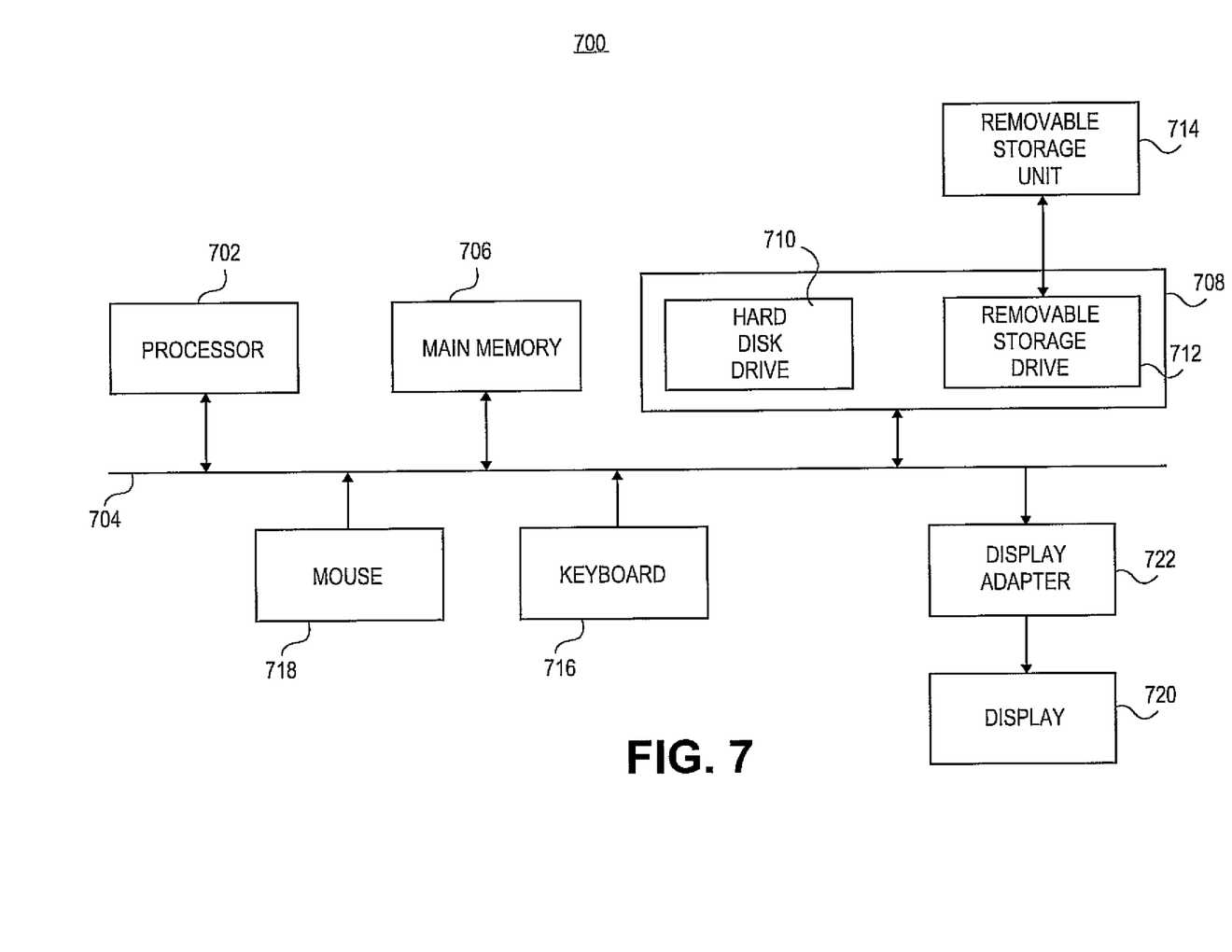
FIG. 7 depicts an exemplary computing platform in accordance with yet another embodiment.

FIG. 7 illustrates an exemplary block diagram of a computing platform 700 where an embodiment may be practiced. The functions of the AS module 120 can be implemented in program code and executed by computing platform 700. AS module 120 may be implemented in computer languages such as PASCAL, C, C++, JAVA, etc.

As shown in FIG. 7, computing platform 700 includes one or more processors, such as processor 702 that provide an execution platform for embodiments of AS module 120. Commands and data from processor 702 are communicated over a communication bus 704. Computing platform 700 also includes a main memory 706, such as a Random Access Memory (RAM), where AS module 120 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for AS module 120 can be stored. Removable storage drive 712 reads from and/or writes to a removable storage unit 714 in a well-known manner. A user interfaces with the AS module 120 with a keyboard 716, a mouse 718, and a display 720. Display adapter 722 interfaces with the communication bus 704 and display 720. Display adapter 722 also receives display data from processor 702 and converts the display data into display commands for display 720.

Additionally, software appliances including management tools, such as software appliance 200, can be implemented on an exemplary computing platform 700. For example, processor 702 can provide an execution platform for embodiments of the software appliance. The software appliance can be executed during runtime on main memory 706. The binary image of the software appliance can be stored in secondary memory 708.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
   storing a plurality of recipes in a repository, wherein each of the plurality of recipes describe the bits that make up an application and at least a portion of an operating system included in a software appliance;
   receiving a request to modify the software appliance, the software appliance comprising a binary image of data embodying the application and the at least the portion of the operating system to provide an execution platform for the application;
   determining, by a processor, modification data representing a modification to the binary image by comparing bits that make up the application and the at least the portion of the operating system in a modified binary image to bits that make up the application and the at least the portion of the operating system in the binary image, wherein the modification comprises a change to bits of the binary image that modify the software appliance according to the request, wherein the modification data to describe the change to the bits of the binary image, and wherein determining the modification data comprises determining a recipe of the plurality of recipes corresponding to the binary image, determining a modified recipe of the modified binary image, wherein the modified binary image embodies data of the software appliance modified according to the request, and comparing the recipe and the modified recipe to determine the change in bits; and
   providing the modification data to an initiator of the request.

2. The method of claim 1, wherein the request to modify the software appliance comprises a request to modify at least one of the application or the at least a portion of the operating system, wherein the at least a portion of the operating system comprises enough resources to support the application.

3. The method of claim 1, wherein the request to modify the software appliance comprises a request to add at least one other application to the software appliance.

4. The method of claim 1, wherein determining the modification data comprises:
   determining the binary image of the software appliance;
   determining the modified binary image of the software appliance, wherein the modified binary image embodies data of the software appliance modified according to the request; and
   comparing the binary image and the modified binary image to determine the change in bits.

5. The method of claim 1, wherein providing the modification data comprises:
   storing the modification data in a repository; and
   providing a link to a location of the modification data in the repository.

6. The method of claim 1, wherein providing the modification data comprises:
   transmitting the modification data to the initiator of the request.

7. The method of claim 1, wherein providing the modification data comprises:
   storing the modification data on a computer readable medium.

8. An apparatus comprising:
   a memory to store a program interface, a control module, and a plurality of recipes, wherein each of the plurality of recipes describe the bits that make up an application and at least a portion of an operating system included in a software appliance; and
   a processor operatively coupled to the memory, the processor to cause
      the program interface to receive a request to modify the software appliance, the software appliance comprising a binary image of data embodying the application and the at least the portion of the operating system to provide an execution platform for the application; and
      the control module to determine modification data representing a modification to the binary image by comparing bits that make up the application and the at least the portion of the operating system in a modified binary image to bits that make up the application and the at least the portion of the operating system in the binary image, wherein the modification comprises a change to bits of the binary image that modify the software appliance according to the request, wherein the modification data to describe the change to the bits of the binary image, and wherein to determine the modification data, the control module to determine a recipe of the plurality of recipes corresponding to the binary image, determine a modified recipe of the modified binary image, wherein the modified binary image embodies data of the software appliance modified according to the request, and compare the recipe and the modified recipe to determine the change in bits,
wherein the program interface further to provide the modification data to an initiator of the request.

9. The apparatus of claim 8, wherein the program interface is further to receive a request to modify at least one of the application or the at least a portion of the operating system, wherein the at least a portion of the operating system comprises enough resources to support the application.

10. The apparatus of claim 8, wherein the program interface is further to receive a request to add at least one other application to the software appliance.

11. The apparatus of claim 8, further comprising:
an updating module coupled to the control module, the updating module to determine the binary image of the software appliance; to determine the modified binary image of the software appliance, wherein the modified binary image embodies data of the software appliance modified according to the request; and to compare the binary image and the modified binary image to determine the change in bits.

12. The apparatus of claim 8, wherein the program interface is further to provide a link to a location of the modification data in a repository.

13. The apparatus of claim 8, wherein the program interface is further to transmit the modification data to the initiator of the request.

14. A system comprising:
a web service portal to provide products and services to the plurality of users, wherein the web-service portal further comprises:
a memory to store a program interface, a control module and a plurality of recipes in a repository, wherein each of the plurality of recipes describe the bits that make up an application and at least a portion of an operating system included in a software appliance; and
a processor operatively coupled to the memory, the processor to cause
the program interface to receive a request to modify the software appliance, the software appliance comprising a binary image of data embodying the application and the at least the portion of the operating system to provide an execution platform for the application; and
the control module to determine modification data representing a modification to the binary image by comparing bits that make up the application and the at least the portion of the operating system in a modified binary image to bits that make up the application and the at least the portion of the operating system in the binary image, wherein the modification comprises a change to bits of the binary image that modify the software appliance according to the request, wherein the modification data to describe the change to the bits of the binary image, and wherein to determine the modification data, the control module to determine a recipe of the plurality of recipes corresponding to the binary image, determine a modified recipe of the modified binary image, wherein the modified binary image embodies data of the software appliance modified according to the request, and compare the recipe and the modified recipe to determine the change in bits,
wherein the program interface further to provide the modification to an initiator of the request.

15. The system of claim 14, wherein the program interface is further to receive a request to modify at least one of the application or the at least a portion of the operating system, wherein the at least a portion of the operating system comprises enough resources to support the application.

16. The system of claim 14, wherein the program interface is further to receive a request to add at least one other application to the software appliance.

17. The system of claim 14, the web-service portal further comprising:
an updating module coupled to the control module, the updating module to determine the binary image of the software appliance; to determine the modified binary image of the software appliance, wherein the modified binary image embodies data of the software appliance modified according to the request; and to compare the binary image and the modified binary image to determine the change in bits.

18. The system of claim 14, wherein the program interface is further to provide a link to the modification a repository.

19. The apparatus of claim 14, wherein the program interface is further to transmit the modification data to the initiator of the request.

20. A non-transitory computer readable storage medium including instructions that, when executed by a processor, cause the processor to perform operations comprising:
storing a plurality of recipes in a repository, wherein each of the plurality of recipes describe the bits that make up an application and at least a portion of an operating system included in a software appliance;
receiving a request to modify the software appliance, the software appliance comprising a binary image of data embodying the application and the at least the portion of the operating system to provide an execution platform for the application;
determining, by the processor, modification data representing a modification to the binary image by comparing bits that make up the application and the at least the portion of the operating system in a modified binary image to bits that make up the application and the at least the portion of the operating system in the binary image, wherein the modification comprises a change to bits of the binary image that modify the software appliance according to the request, wherein the modification data to describe the change to the bits of the binary image, and wherein determining the modification data comprises determining a recipe of the plurality of recipes corresponding to the binary image, determining a modified recipe of the modified binary image, wherein the modified binary image embodies data of the software appliance modified according to the request, and comparing the recipe and the modified recipe to determine the change in bits; and
providing the modification data to an initiator of the request.

21. The storage medium of claim 20, wherein determining the modification data comprises:
determining the binary image of the software appliance;
determining the modified binary image of the software appliance, wherein the modified binary image embodies data of the software appliance modified according to the request; and
comparing the binary image and the modified binary image to determine the change in bits.

22. The storage medium of claim 20, wherein providing the modification data comprises:

transmitting the modification data to the initiator of the request.

\* \* \* \* \*